US 11,288,422 B2

(12) United States Patent
Chu et al.

(10) Patent No.: US 11,288,422 B2
(45) Date of Patent: Mar. 29, 2022

(54) SIMULATION EVALUATION MODEL OF HIGH VOLTAGE RIDE THROUGH CAPABILITY, SIMULATION EVALUATION METHOD BASED ON THE SAME AND STORAGE MEDIUM

(71) Applicant: GUODIAN UNITED POWER TECHNOLOGY COMPANY LTD., Beijing (CN)

(72) Inventors: Jingchun Chu, Beijing (CN); Ling Yuan, Beijing (CN); Lei Pan, Beijing (CN); Wenchao Chen, Beijing (CN); Chong Jiao, Beijing (CN); Fa Xie, Beijing (CN); Wen Du, Beijing (CN); Yanping Li, Beijing (CN); Qian Wang, Beijing (CN); Xuefeng Lin, Beijing (CN); Yan Ding, Beijing (CN)

(73) Assignee: GUODIAN UNITED POWER TECHNOLOGY COMPANY LTD., Beijing (CN)

( * ) Notice: Subject to any disclaimer, the term of this patent is extended or adjusted under 35 U.S.C. 154(b) by 270 days.

(21) Appl. No.: 16/609,743

(22) PCT Filed: Jun. 29, 2018

(86) PCT No.: PCT/CN2018/093806
§ 371 (c)(1),
(2) Date: Oct. 31, 2019

(87) PCT Pub. No.: WO2019/100721
PCT Pub. Date: May 31, 2019

(65) Prior Publication Data
US 2020/0082043 A1    Mar. 12, 2020

(30) Foreign Application Priority Data
Nov. 24, 2017 (CN) .......................... 201711192186.5

(51) Int. Cl.
*G06F 30/20*      (2020.01)
*G06F 111/10*    (2020.01)
*H02P 9/10*       (2006.01)

(52) U.S. Cl.
CPC .......... *G06F 30/20* (2020.01); *G06F 2111/10* (2020.01); *H02P 9/107* (2013.01)

(58) Field of Classification Search
CPC ................................. G06F 30/20; H02P 9/107
(Continued)

(56) References Cited

U.S. PATENT DOCUMENTS

| 7,339,355 | B2 * | 3/2008 | Erdman | .................. | H02J 3/386 |
| | | | | | 322/29 |
| 7,432,686 | B2 * | 10/2008 | Erdman | .................. | H02J 3/386 |
| | | | | | 322/44 |

(Continued)

FOREIGN PATENT DOCUMENTS

| CN | 101383576 A | 3/2009 |
| CN | 103955572 A | 7/2014 |

(Continued)

*Primary Examiner* — Thai Q Phan
(74) *Attorney, Agent, or Firm* — Bayramoglu Law Offices LLC (57) ABSTRACT

A simulation evaluation model of a high voltage ride through capability includes a wind turbine system aerodynamic model, a torque control model, a converter model, and a high voltage fault generating device model connected in sequence; the wind turbine system aerodynamic model is configured to calculate an airflow input power; the torque control model is configured to calculate a rotor electromagnetic torque according to the airflow input power; the high voltage fault generating device model is configured to simulate a high voltage fault and output a predetermined voltage on a low voltage side of a transformer; and the converter model is configured to calculate a stator reactive current, an active power and a reactive power of the wind (Continued)

turbine system during the high voltage fault according to the airflow input power, the rotor electromagnetic torque and the predetermined voltage on the low voltage side of the transformer.

19 Claims, 5 Drawing Sheets

(58) Field of Classification Search
USPC .................................................. 703/2, 18, 19
See application file for complete search history.

(56) References Cited

U.S. PATENT DOCUMENTS

| | | | | |
|---|---|---|---|---|
| 7,535,120 | B2 * | 5/2009 | Erdman | H02J 3/381 |
| | | | | 307/47 |
| 9,461,573 | B2 * | 10/2016 | El Moursi | H02P 29/032 |
| 9,529,057 | B2 * | 12/2016 | Shrestha | G01R 31/40 |
| 9,639,643 | B2 * | 5/2017 | Pan | G01D 4/002 |
| 2005/0122083 | A1 * | 6/2005 | Erdman | H02J 3/386 |
| | | | | 322/20 |
| 2005/0192859 | A1 | 9/2005 | Mertins et al. | |
| 2007/0187955 | A1 * | 8/2007 | Erdman | H02P 9/107 |
| | | | | 290/44 |
| 2008/0007121 | A1 * | 1/2008 | Erdman | F03D 9/257 |
| | | | | 307/47 |
| 2008/0018309 | A1 * | 1/2008 | Erdman | F03D 7/048 |
| | | | | 322/20 |
| 2014/0032138 | A1 * | 1/2014 | Shrestha | H02H 1/0092 |
| | | | | 702/58 |
| 2014/0225370 | A1 * | 8/2014 | Mayer | H02J 3/16 |
| | | | | 290/44 |
| 2015/0077067 | A1 * | 3/2015 | Kanjiya | H02H 7/067 |
| | | | | 322/21 |
| 2015/0337808 | A1 * | 11/2015 | Kang | F03D 9/257 |
| | | | | 290/44 |

FOREIGN PATENT DOCUMENTS

| | | |
|---|---|---|
| CN | 105589985 A | 5/2016 |
| CN | 107944142 A | 4/2018 |

* cited by examiner

FIG. 10

SIMULATION EVALUATION MODEL OF HIGH VOLTAGE RIDE THROUGH CAPABILITY, SIMULATION EVALUATION METHOD BASED ON THE SAME AND STORAGE MEDIUM

CROSS REFERENCE TO THE RELATED APPLICATIONS

This application is the national phase entry of International Application No. PCT/CN2018/093806, filed on Jun. 29, 2018, which is based upon and claims priority to Chinese Patent Application No. 201711192186.5, filed on Nov. 24, 2017, the entire contents of which are incorporated herein by reference.

TECHNICAL FIELD

The present disclosure relates to the technical field of wind turbine systems, and more specifically relates to a simulation evaluation model of a high voltage ride through capability, a simulation evaluation method based on the simulation evaluation model and a storage medium.

BACKGROUND

Previously, the China Electric Power Research Institute took the lead in proposing a test procedure on wind turbine system fault ride through capability (discussion draft). The following are the specific requirements for the high voltage ride through capability of a wind turbine system.

The wind turbine system should have the capability to operate continuously without disconnecting from the grid within a specified voltage and time duration, and quickly realize power recovery after the voltage returns to normal. During the fault, the wind turbine system should provide an inductive reactive current to support and assist power grid voltage recovery.

Specific requirements are as follows:

A) The wind turbine system should have the capability to operate continuously for 200 ms without disconnecting from the grid when the voltage at the grid connection point of the wind turbine system rises to 1.3 PU;

B) The wind turbine system should have the capability to operate continuously for 1s without disconnecting from the grid when the voltage at the grid connection point of the wind turbine system rises to 1.25 PU;

C) The wind turbine system should have the capability to operate continuously for 2 s without disconnection from the grid when the voltage at the grid connection point of the wind turbine system rises to 1.2 PU, D) The wind turbine system should have the capability to operate continuously for 10 s without disconnecting from the grid when the voltage at the grid connection point of the wind turbine system rises to 1.15 PU; and E) The wind turbine system should have the capability to operate continuously for an extended period of time without disconnecting from the grid when the voltage at the grid connection point of the wind turbine system rises to 1.1 PU.

Figure 1:
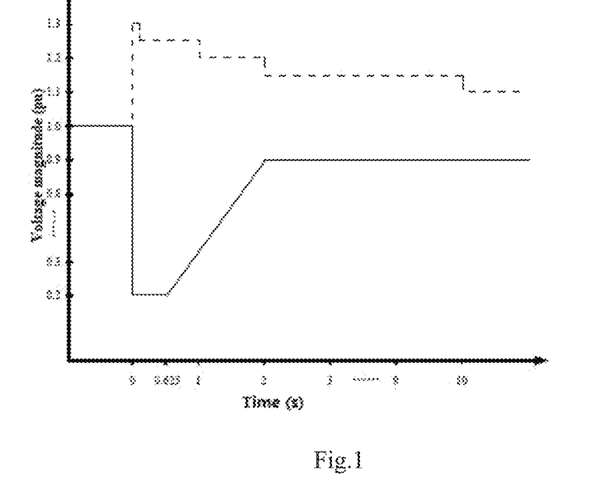
FIG. 1 shows a curve of a high voltage fault in a test procedure (discussion draft) on wind turbine system fault ride through capability.

That is, when a three-phase short circuit occurs in the power system, in principle, the wind turbine system that normally generates electricity at a voltage in a range below the dotted line and above the solid line needs to operate continuously without disconnecting from the grid, as shown in FIG. 1. In the prior art, a high voltage ride through mobile vehicle test equipment is mainly used for testing the high voltage ride through capability of the wind turbine system on the spot, which is a complicated and costly test process. In the prior art, there is a simulation evaluation method for a low voltage ride through capability of the wind turbine system, but a simulation evaluation method for a high voltage ride through capability has not been disclosed.

Therefore, an urgent problem to be solved by those skilled in the art is how to create a simulation evaluation model for a high voltage ride through capability and a simulation evaluation method based thereon, allowing a simulation of high voltage faults and evaluating the operating state of a wind turbine system during such a fault, so as to verify whether the wind turbine system has the high voltage ride through capability.

SUMMARY

The present disclosure aims to provide a simulation evaluation model of a high voltage ride through capability, a simulation evaluation method based on thereon and a storage medium, allowing a high voltage fault simulation and evaluation of the operating state of a wind turbine system during the high voltage fault, so as to verify whether the wind turbine system has the high voltage ride through capability.

To achieve the above objective, the present disclosure uses the following technical solutions.

In a first aspect, the present disclosure provides a simulation evaluation model of a high voltage ride through capability, including a wind turbine system aerodynamic model, a torque control model, a converter model, and a high voltage fault generating device model; the wind turbine system aerodynamic model is configured to calculate an airflow input power according to an input initialization evaluation parameter; the torque control model is configured to calculate a rotor electromagnetic torque according to the airflow input power; the high voltage fault generating device model is configured to simulate a high voltage fault according to the input initialization evaluation parameter, and output a predetermined voltage on a low voltage side of a transformer; and the converter model is configured to calculate a stator reactive current, an active power and a reactive power of the wind turbine system during the high voltage fault according to the airflow input power, the rotor electromagnetic torque and the predetermined voltage on the low voltage side of the transformer.

In combination with the first aspect, as an optional embodiment of the present disclosure, the wind turbine system aerodynamic model is further configured to obtain an input wind turbine system blade length, an input wind velocity, an input air density, an input wind turbine system blade angular velocity, and an input wind energy availability; wherein, the initialization evaluation parameter includes: the wind turbine system blade length, the wind velocity, the air density, the wind turbine system blade angular velocity, and the wind energy availability; a tip speed ratio is obtained according to a ratio of a blade tip linear velocity to the wind velocity; and the airflow input power is obtained by inputting the wind turbine system blade length, the wind velocity, the air density, the wind energy availability, a blade pitch angle, and the tip speed ratio to a predetermined airflow input power calculation formula for calculation.

In combination with the first aspect, as an optional embodiment of the present disclosure, the air flow input power $P_m$ is calculated according to the following formula: $P_m = \frac{1}{2}\pi r_b^2 v_w^3 \rho c_p(\lambda, \beta)$, wherein $P_m$ is the airflow input power, $\pi$ is the ratio of circumference to diameter, $r_b$ is the wind turbine system blade length, $v_w$ is the wind velocity, $\rho$ is the air density, $\lambda$ is the tip speed ratio, that is, the ratio of the blade tip linear velocity to the wind velocity, $$\lambda = \frac{w_b r_b}{v_w},$$

$w_b$ is the wind turbine system blade angular velocity, $\beta$ is the blade pitch angle, and $c_p$ is the wind energy availability.

In combination with the first aspect, as an optional embodiment of the present disclosure, the torque control model is further configured to input an obtained rotor mechanical inertia, a rotor motion damping coefficient, and a rotor mechanical angular velocity into a rotor electromagnetic torque calculation formula preset in the torque control model for calculation.

In combination with the first aspect, as an optional embodiment of the present disclosure, the rotor electromagnetic torque $T_e$ is calculated according to the following formula:

$$T_e = \frac{P_m}{w_{rm}} - \left(J_r \frac{dw_{rm}}{dt} + k_r w_{rm}\right),$$

wherein, $T_e$ is the rotor electromagnetic torque, $P_m$ is the airflow input power, $J_r$ is the rotor mechanical inertia, $k_r$ is the rotor motion damping coefficient, and $w_{rm}$ is the rotor mechanical angular velocity.

In combination with the first aspect, as an optional embodiment of the present disclosure, the high voltage fault generating device model is further configured to obtain an input series reactor impedance value, an input grid impedance, and an input wind turbine system capacity, wherein, the initialization evaluation parameter includes: the series reactor impedance value, the grid impedance, and the wind turbine system capacity; and the predetermined voltage on the low voltage side of the transformer is obtained by inputting the series reactor impedance value, the grid impedance and the wind turbine system capacity to a predetermined calculation formula that is configured for simulating the predetermined voltage at the low voltage side of the transformer under the high voltage fault.

In combination with the first aspect, as an optional embodiment of the present disclosure, the predetermined voltage $u_s$ on the low voltage side of the transformer is calculated according to the following formula:

$$X_1 = \frac{u_s^2}{3 * S_{WT}} - X_{grid},$$

wherein, $u_s$ is the predetermined voltage on the low voltage side of the transformer, i.e., a stator voltage of the converter, $X_1$ is the series reactor impedance value, $X_{grid}$ is the grid impedance, and $S_{WT}$ is the wind turbine system capacity.

In combination with the first aspect, as an optional embodiment of the present disclosure, the converter model is further configured to obtain the stator reactive current by inputting an obtained q-axis stator flux linkage, a predetermined stator self inductance, a predetermined stator mutual inductance and a predetermined q-axis rotor current to a predetermined stator reactive current calculation formula for calculation; the converter model is further configured to obtain the active power by inputting obtained a stator rotational velocity, the airflow input power, the rotor electromagnetic torque, and the predetermined voltage on the low voltage side of the transformer into a predetermined active power calculation formula for calculation; and the converter model is further configured to obtain the reactive power by inputting an obtained d-axis rotor current, a d-axis stator voltage, a stator mutual inductance, the q-axis rotor current, the stator rotational velocity, the airflow input power, and the rotor electromagnetic torque to a predetermined reactive power calculation formula for calculation.

In combination with the first aspect, as an optional embodiment of the present disclosure, a calculation formula of the stator reactive current $i_{qs}$ is as follows:

$$i_{qs} = \frac{\lambda_{qs} - L_M i_{qr}}{L_S},$$

$i_{qs}$ is a q-axis stator current, i.e. the stator reactive current, $\lambda_{qs}$ is the q-axis stator flux linkage, $L_S$ is the stator self inductance, $L_M$ is the stator mutual inductance, and $i_{qr}$ is the q-axis rotor current. Calculation formulas of the active power $P_S$ and the reactive power $Q_S$ are respectively as follows:

$$\begin{cases} P_S = \frac{T_e \omega_s}{P_m} \\ Q_S = -\frac{T_e}{P_m i_{dr}}\left(\omega_s i_{qr} + \frac{v_{ds}}{L_M}\right), \end{cases}$$

wherein $P_S$ is the active power, $Q_S$ is the reactive power, $P_m$ is the airflow input power, $T$ is the rotor electromagnetic torque, $w_s$ is the stator rotational velocity, $i_{dr}$ and $i_{qr}$ are the d-axis rotor current and the q-axis rotor current, respectively, $v_{ds}$ is the d-axis stator voltage, and $L_M$ is the stator mutual inductance.

In a second aspect, the present disclosure provides a simulation evaluation method of the high voltage ride through capability based on the above simulation evaluation model of high voltage ride through capability, including the following steps: S1, calculating to obtain the airflow input power by the wind turbine system aerodynamic model according to the input initialization evaluation parameter; S2, calculating to obtain the rotor electromagnetic torque by the torque control model according to the airflow input power obtained; S3, simulating the high voltage fault and outputting the predetermined voltage on the low voltage side of the transformer by the high voltage fault generating device model according to the input initialization evaluation parameter; S4, calculating the stator reactive current, the active power and the reactive power of the wind turbine system during the high voltage fault by the converter model according to the airflow input power, the rotor electromagnetic torque, and the predetermined voltage on the low voltage side of the transformer; and S5, determining whether the wind turbine system has the high voltage ride through capability according to the predetermined voltage on the low voltage side of the transformer, the stator reactive current, the active power, and the reactive power.

In combination with the second aspect, as an optional embodiment of the present disclosure, the step of calculating to obtain the airflow input power by the wind turbine system aerodynamic model according to the input initialization evaluation parameter, includes: obtaining an input wind turbine system blade length, an input wind velocity, an input air density, an input wind turbine system blade angular velocity, and an input wind energy availability by the wind turbine system aerodynamic model, wherein, the initialization evaluation parameter includes: the wind turbine system blade length, the wind velocity, the air density, the wind turbine system blade angular velocity, and the wind energy availability; a tip speed ratio is obtained by the wind turbine system aerodynamic model according to a ratio of a blade tip linear velocity to the wind velocity; and the wind turbine system blade length, the wind velocity, the air density, the wind energy availability, the blade pitch angle, and the tip speed ratio are input to a predetermined airflow input power calculation formula by the wind turbine system aerodynamic model for calculation to obtain the airflow input power.

In combination with the second aspect, as an optional embodiment of the present disclosure, the step of calculating to obtain the rotor electromagnetic torque by the torque control model according to the airflow input power obtained, includes: inputting the obtained rotor mechanical inertia, the rotor motion damping coefficient, and the rotor mechanical angular velocity to a rotor electromagnetic torque calculation formula preset in the torque control model for calculation.

In combination with the second aspect, as an optional embodiment of the present disclosure, the step of simulating the high voltage fault and outputting the predetermined voltage on the low voltage side of the transformer by the high voltage fault generating device model according to the input initialization evaluation parameter, includes: obtaining an input series reactor impedance value, an input grid impedance, and an input wind turbine system capacity by the high voltage fault generating device model, wherein, the initialization evaluation parameter includes: the series reactor impedance value, the grid impedance, and the wind turbine system capacity; and the predetermined voltage on the low voltage side of the transformer is obtained by inputting the series reactor impedance value, the grid impedance and the wind turbine system capacity are input to a predetermined calculation formula that is configured to simulate a predetermined voltage on a low voltage side of a transformer under a high voltage fault by the high voltage fault generating device model for calculation.

In combination with the second aspect, as an optional embodiment of the present disclosure, the step of calculating the stator reactive current, the active power and the reactive power of the wind turbine system during the high voltage fault by the converter model according to the airflow input power, the rotor electromagnetic torque, and the predetermined voltage on the low voltage side of the transformer, includes: the converter model inputting a obtained q-axis stator flux linkage, a predetermined stator self inductance, a predetermined stator mutual inductance and a predetermined q-axis rotor current to a predetermined stator reactive current calculation formula for calculation to obtain the stator reactive current; the converter model inputting the obtained stator rotational velocity, the airflow input power, the rotor electromagnetic torque, and the predetermined voltage on the low voltage side of the transformer into a predetermined active power calculation formula for calculation to obtain the active power; and the converter model inputting an obtained d-axis rotor current, a d-axis stator voltage, a stator mutual inductance, the q-axis rotor current, the stator rotational velocity, the airflow input power, and the rotor electromagnetic torque to a predetermined reactive power calculation formula for calculation to obtain the reactive power.

In a third aspect, the present disclosure provides a readable storage medium storing executable instructions, wherein, when the instructions are executed by one or more processors, the simulation evaluation method of the high voltage ride through capability based on the simulation evaluation model of the high voltage ride through capability is realized.

For the use of the above technical solutions, the present disclosure has at least the following advantages.

The simulation evaluation model of the high voltage ride through capability, and the simulation evaluation method based thereon of the present disclosure can simulate a high voltage fault generated in high-level debugging process for direct current of power grid in practice, or cascading high voltage faults generated due to a plurality of reactive power generating devices in a wind power plant failing to timely exit after the low voltage ride through, which is caused by cascading low voltage faults, and can evaluate the operating state in the fault process of the wind turbine system, determine whether the wind turbine system has the high voltage ride through capability by the simulation method, and can replace the high voltage ride through mobile vehicle test equipment on the spot, which reduces the test cost.

BRIEF DESCRIPTION OF THE DRAWINGS

The above description is merely the summary of the technical solutions in the present disclosure, and in order to specify the technical means of the present disclosure, the present disclosure will be further described in detail below with reference to the accompanying drawings and specific embodiments.

DETAILED DESCRIPTION OF THE EMBODIMENTS

Figure 2:
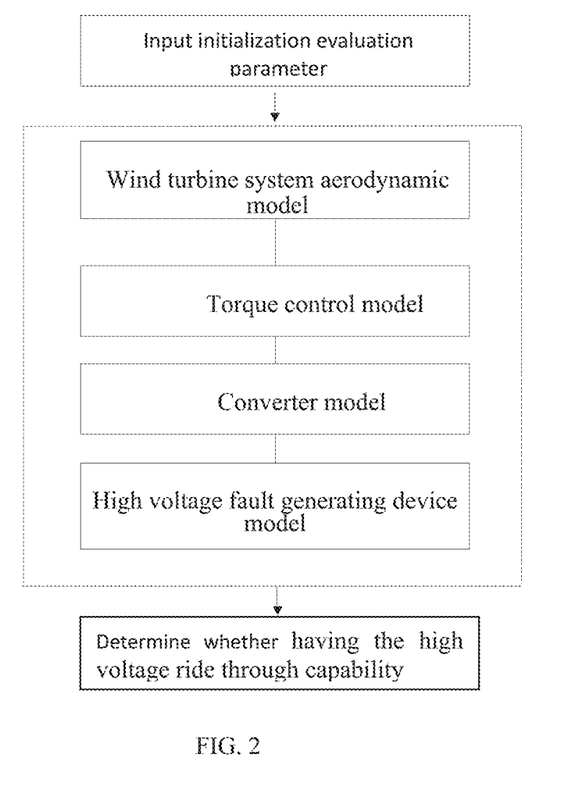
FIG. 2 is a structural schematic diagram of a simulation evaluation model of a high voltage ride through capability in the present disclosure.

Referring to FIG. 2, the present disclosure provides a simulation evaluation model of a high voltage ride through capability, including a wind turbine system aerodynamic model, a torque control model, a converter model, and a high voltage fault generating device model. The simulation evaluation model of the high voltage ride through capability can run on a terminal device, wherein the terminal device may be a hardware device such as a personal computer, a mobile device, etc.

Further, the wind turbine system aerodynamic model may be a software module configured to calculate an airflow input power according to an input initialization evaluation parameter.

In this embodiment, the wind turbine system aerodynamic model can obtain the initialization evaluation parameter first, wherein, the initialization evaluation parameter includes: a wind turbine system blade length, a wind velocity, an air density, a wind turbine system blade angular velocity, and a wind energy availability. Thus, the wind turbine system aerodynamic model first obtains a tip speed ratio according to a ratio of a blade tip linear velocity to the wind velocity in the obtained wind turbine system blade length, the wind velocity, the air density, the wind turbine system blade angular velocity, and the wind energy availability. Subsequently, the wind turbine system aerodynamic model calls the predetermined airflow input power calculation formula and calculates to obtain the airflow input power according to the wind turbine system blade length, the wind velocity, the air density, the wind energy availability, the blade pitch angle, and the tip speed ratio.

Optionally, the air flow input power $P_m$ is calculated according to the following formula:

$$P_m = \frac{1}{2}\pi r_b^2 v_w^3 \rho c_p(\lambda, \beta) \qquad (1)$$

where, $P_m$ is the airflow input power, $\pi$ is the ratio of circumference to diameter, $r_b$ is the wind turbine system blade length, $v_w$ is the wind velocity, $\rho$ is the air density, $\lambda$ is the tip speed ratio, that is, a ratio of the blade tip linear velocity to the wind velocity, $$\lambda = \frac{w_b r_b}{v_w},$$

$w_b$ is the wind turbine system blade angular velocity, $\beta$ is the blade pitch angle, and $c_p$ is the wind energy availability.

The empirical values of the wind energy availability $c_p$ are shown in Table 1 below:

TABLE 1

Value table of wind energy availability $cp$

| Wind velocity (m/s) | Availability |
| --- | --- |
| 5 | 0.480443 |
| 6 | 0.480442 |

TABLE 1-continued

Value table of wind energy availability $cp$

| Wind velocity (m/s) | Availability |
| --- | --- |
| 7 | 0.480443 |
| 8 | 0.471194 |
| 9 | 0.369719 |
| 10 | 0.269514 |

The torque control model is configured to calculate the rotor electromagnetic torque according to the airflow input power output by the wind turbine system aerodynamic model. That is, a wind turbine system impeller, a transmission shaft and a generator rotor are simulated as an inertial body, and a transmission process of a shaft torque is simulated by one first order inertia element.

In this embodiment, the torque control model obtains the rotor electromagnetic torque by the following method.

The torque control model can call a predetermined rotor electromagnetic torque calculation formula, and the rotor electromagnetic torque can be obtained by inputting the obtained rotor mechanical inertia, the rotor motion damping coefficient and the rotor mechanical angular velocity to the torque control model.

Optionally, the rotor electromagnetic torque $T_e$ is calculated according to the following formula in the torque control model:

$$T_m = \frac{P_m}{w_{rm}} \qquad (2)$$

$$J_r \frac{dw_{rm}}{dt} + k_r w_{rm} = T_m - T_e \qquad (3)$$

where, $T_e$ is the rotor electromagnetic torque, $T_m$ is a generator torque, $J_r$ is the rotor mechanical inertia, $k_r$ is the rotor motion damping coefficient, and $w_{rm}$ is the rotor mechanical angular velocity.

$$T_e = \frac{P_m}{w_{rm}} - \left( J_r \frac{dw_{rm}}{dt} + k_r w_{rm} \right) \qquad (4)$$

The high voltage fault generating device model is configured to simulate a high voltage fault according to an input initialization evaluation parameter, and calculate a predetermined voltage on a low voltage side of a transformer.

In this embodiment, the high voltage fault generating device model calculates the predetermined voltage on the low voltage side of the transformer by the following method.

First, the initialization evaluation parameter further includes: a series reactor impedance value, a grid impedance, and a wind turbine system capacity. Thus, the high voltage fault generating device model can further obtain the input series reactor impedance value, the input grid impedance and the input wind turbine system capacity. Subsequently, the high voltage fault generating device model can call a transformer low-voltage-side predetermined-voltage calculation formula for calculation configured to simulate the high voltage fault, and the predetermined voltage on the low voltage side of the transformer is obtained based on the series reactor impedance value, the grid impedance and the wind turbine system capacity.

Optionally, the predetermined voltage $u_s$ on the low voltage side of the transformer is calculated as follows:

$$X_1 = \frac{u_s^2}{3*S_{WT}} - X_{grid} \quad (5)$$

where, $u_s$ is the predetermined voltage on the low voltage side of the transformer, i.e., a stator voltage of a converter, $X_1$ is the series reactor impedance value, $X_{grid}$ is the grid impedance, and $S_{WT}$ is the wind turbine system capacity. Different predetermined voltages $u_s$ on the low voltage side of the transformer can be generated by adjusting $X_1$ according to different test requirements.

The converter model can respectively calculate the stator reactive current, the active power and the reactive power of the wind turbine system during the high voltage fault according to the airflow input power, the rotor electromagnetic torque, and the predetermined voltage on the low voltage side of the transformer.

In this embodiment, the converter model calculates the stator reactive current, the active power and the reactive power of the wind turbine system by the following method.

First, the converter model obtains a q-axis stator flux linkage that can be input by a user. The stator reactive current is obtained by inputting the obtained q-axis stator flux linkage, a predetermined stator self inductance, a predetermined stator mutual inductance and a predetermined q-axis rotor current to a predetermined stator reactive current calculation formula for calculation in the converter model.

Second, the converter model can also obtain a stator rotational velocity, wherein the stator rotational velocity can be input by the user as well. The active power is obtained by inputting the obtained stator rotational velocity, the airflow input power, the rotor electromagnetic torque, and the predetermined voltage on the low voltage side of the transformer into a predetermined active power calculation formula for calculation by the converter model.

Furthermore, the converter model can also obtain a d-axis rotor current, a d-axis stator voltage, and a stator mutual inductance, wherein the d-axis rotor current, the d-axis stator voltage and the stator mutual inductance can be input by the user. Subsequently, the reactive power is obtained by inputting the d-axis rotor current, the d-axis stator voltage, the stator mutual inductance, the q-axis rotor current, the stator rotational velocity, the airflow input power, and the rotor electromagnetic torque to a predetermined reactive power calculation formula for calculation by the converter model.

Optionally, the converter model is configured to output the stator reactive current $i_{qs}$, the active power $P_s$ and the reactive power $Q_s$ of the wind turbine system during the high voltage fault according to the airflow input power $P_m$, the rotor electromagnetic torque $T_e$ and the predetermined voltage $u_s$ on the low voltage side of the transformer.

The rotor electromagnetic torque $T_e$ can be expressed as follows:

$$T_e = 1.5 P_m (i_{qs}\lambda_{ds} - i_{ds}\lambda_{qs}) \quad (6)$$

where, $i_{ds}$ and $i_{qs}$ are the d-axis stator current and the q-axis stator current respectively, i.e. the stator reactive current and the stator active current. $\lambda_{ds}$ and $\lambda_{qs}$ are the d-axis stator flux linkage and the q-axis stator flux linkage respectively. The calculation formulas of $\lambda_{ds}$ and $\lambda_{qs}$ are as follows:

$$\begin{cases} \lambda_{ds} = L_S i_{ds} + L_M i_{dr} \\ \lambda_{qs} = L_S i_{qs} + L_M i_{qr} \end{cases} \quad (7)$$

where, $L_S$ and $L_M$ are the stator self inductance and stator mutual inductance respectively; $i_{dr}$ and $i_{qr}$ are the d-axis rotor current and the q-axis rotor current respectively, i.e. the rotor reactive current and the rotor active current. The calculation formulas for $i_{ds}$ and $i_{qs}$ are as follows:

$$\begin{cases} i_{ds} = \frac{\lambda_{ds} - L_M i_{dr}}{L_S} \\ i_{qs} = \frac{\lambda_{qs} - L_M i_{qr}}{L_S} \end{cases} \quad (8)$$

The following formula is obtained by putting the formula (8) is into the formula (6):

$$T_e = \frac{1.5 P_m L_M}{L_S}(-i_{qr}\lambda_{ds} + i_{dr}\lambda_{qs}) \quad (9)$$

As can be seen from the above formula, the rotor electromagnetic torque $T_e$ can be expressed as a function of the rotor current and the stator flux linkage.

Further, in a steady state of a generator, a stator voltage vector $\vec{u}_S$ can be expressed as follows:

$$\vec{u}_S = R_S \vec{I}_S + j\omega_S \vec{\lambda}_{qs} \quad (10)$$

where, $\vec{u}_S$ is the stator voltage vector, $R_S$ is a stator resistance, $\vec{I}_S$ is a stator current vector, $j$ is a vector imaginary part, $\omega_s$ is the stator rotational velocity, and $\vec{\lambda}_s$ is a stator flux linkage vector.

After conversion by d-axis coordinate and q-axis coordinates, it can be expressed as follows:

$$(v_{ds}+jv_{qs}) = R_S(i_{ds}+ji_{qs}) + j\omega_s(\lambda_{ds}+j) \quad (11)$$

where, $v_{dc}$ is the d-axis stator voltage, and $v_{qc}$ is the q-axis stator voltage.

As can be seen from the above formula, the d-axis stator flux linkage and the q-axis stator flux linkage can be respectively expressed as follows:

$$\begin{cases} \lambda_{ds} = \frac{v_{qs} - R_S i_{qs}}{\omega_s} \\ \lambda_{qs} = -\frac{v_{ds} - R_S i_{ds}}{\omega_s} \end{cases} \quad (12)$$

The following formula is obtained by putting the formula (12) into the formula (9):

$$T_e = \frac{3 P_m L_M}{2\omega_s L_S}(-i_{qr}v_{qs} + R_S i_{qs}i_{qr} + R_S i_{ds}i_{dr} - i_{dr}v_{ds}) \quad (13)$$

In an orientation control of the stator voltage, let $v_{qs}=0$, the formula can be simplified, and in a doubly fed induction generator, $R_s$ is small, and the equation is finally simplified as follows:

$$T_e = -\frac{3P_m L_M}{2\omega_s L_S} i_{dr} v_{ds} \quad (14)$$

As can be seen from the above formula, the rotor electromagnetic torque $T_e$ can be expressed as a function of the d-axis rotor current $i_{dr}$ and the stator voltage $v_{ds}$.

The formulas for calculating the active power and the reactive power are as follows:

$$\begin{cases} P_S = 1.5(v_{ds}i_{ds} + v_{qs}i_{qs}) \\ Q_S = 1.5(v_{qs}i_{ds} - v_{ds}i_{qs}) \end{cases} \quad (15)$$

where, $P_S$ is the active power, $Q_S$ is the reactive power, and the stator voltage orientation control is performed, let $v_{qs}=0$, the above formula can be simplified as follows:

$$\begin{cases} P_S = 1.5 v_{ds} i_{ds} \\ Q_S = -1.5 v_{ds} i_{qs} \end{cases} \quad (16)$$

the following formula is obtained by putting the formula (8) into the formula (16):

$$\begin{cases} P_S = 1.5 v_{ds} \left( \frac{\lambda_{ds} - L_M i_{dr}}{L_S} \right) \\ Q_S = -1.5 v_{ds} \left( \frac{\lambda_{qs} - L_M i_{qr}}{L_S} \right) \end{cases} \quad (17)$$

the following formula is obtained according to the above formula:

$$\begin{cases} i_{dr} = -\frac{2L_S}{3v_{ds}L_M} P_S + \frac{1}{L_M} \lambda_{ds} \\ i_{qr} = \frac{2L_S}{3v_{ds}L_M} Q_S + \frac{1}{L_M} \lambda_{qs} \end{cases} \quad (18)$$

the following formula is obtained by putting the formula (12) into the formula (18):

$$\begin{cases} i_{dr} = -\frac{2L_S}{3v_{ds}L_M} P_S + \frac{v_{qs} - R_S i_{qs}}{\omega_s L_M} \\ i_{qr} = \frac{2L_S}{3v_{ds}L_M} Q_S - \frac{v_{ds} - R_S i_{ds}}{\omega_s L_M} \end{cases} \quad (19)$$

when $v_{qs}=0$, and the stator resistance $R_S$ is ignored, the following formula can be obtained:

$$\begin{cases} i_{dr} = -\frac{2L_S}{3v_{ds}L_M} P_S \\ i_{qr} = \frac{2L_S}{3v_{ds}L_M} Q_S - \frac{v_{ds}}{\omega_s L_M} \end{cases} \quad (20)$$

as can be concluded that after the stator voltage is determined, the active power $P_S$ and the reactive power $Q_S$ can be calculated according to the d-axis rotor current and the q-axis rotor current.

The following formula is obtained by putting the formula (14) into the formula (20):

$$\begin{cases} P_S = \frac{T_e \omega_s}{P_m} \\ Q_S = -\frac{T_e}{P_m i_{dr}} \left( \omega_s i_{qr} + \frac{v_{ds}}{L_M} \right) \end{cases} \quad (21)$$

The present disclosure provides a simulation evaluation method of a high voltage ride through capability based on the above simulation evaluation model of the high voltage ride through capability, including the following steps:

S1, the wind turbine system aerodynamic model obtains the airflow input power according to the input initialization evaluation parameter;

S2, the rotor electromagnetic torque is obtained by the torque control model according to the airflow input power obtained;

S3, the high voltage fault generating device model simulates the high voltage fault and outputs the predetermined voltage on the low voltage side of the transformer according to the input initialization evaluation parameter;

S4, the converter model calculates the stator reactive current, the active power and the reactive power of the wind turbine system during the high voltage fault according to the airflow input power, the rotor electromagnetic torque, and the predetermined voltage on the low voltage side of the transformer; and S5, whether the wind turbine system has the high voltage ride through capability is determined according to the predetermined voltage on the low voltage side of the transformer, the stator reactive current, the active power, and the reactive power.

Further, as an optional method, the step S1 specifically includes:

S11, the wind turbine system aerodynamic model obtains an input wind turbine system blade length, an input wind velocity, an input air density, an input wind turbine system blade angular velocity, and an input wind energy availability, wherein, the initialization evaluation parameter includes: the wind turbine system blade length, the wind velocity, the air density, the wind turbine system blade angular velocity, and the wind energy availability;

S12, a tip speed ratio is obtained according to a ratio of a blade tip linear velocity to the wind velocity; and S13, the wind turbine system aerodynamic mode inputs the wind turbine system blade length, the wind velocity, the air density, the wind energy availability, the blade pitch angle, and the tip speed ratio to a predetermined airflow input power calculation formula for calculation to obtain the airflow input power.

Further, as an optional method, the step S2 specifically includes: the obtained rotor mechanical inertia, the rotor motion damping coefficient, and the rotor mechanical angular velocity are input by the torque control module to a rotor electromagnetic torque calculation formula preset in the torque control model for calculation to obtain the rotor electromagnetic torque.

Further, as an optional method, the step S3 specifically includes:

S31, the high voltage fault generating device model obtains an input series reactor impedance value, an input grid impedance, and an input wind turbine system capacity, wherein, the initialization evaluation parameter includes: the series reactor impedance value, the grid impedance, and the wind turbine system capacity; and S32, the predetermined voltage on the low voltage side of the transformer is obtained by inputting the series reactor impedance value, the grid impedance and the wind turbine system capacity into a predetermined calculation formula of a predetermined voltage on a low voltage side of a transformer configured to simulate the high voltage fault for calculation by the high voltage fault generating device model.

Further, as an optional method, the step S4 specifically includes:

S41, the stator reactive current is obtained by inputting an obtained q-axis stator flux linkage, a predetermined stator self inductance, a predetermined stator mutual inductance and a predetermined q-axis rotor current to a predetermined stator reactive current calculation formula for calculation in the converter model.

S42, the active power is obtained by inputting the obtained stator rotational velocity, the airflow input power, the rotor electromagnetic torque, and the predetermined voltage on the low voltage side of the transformer into a predetermined active power calculation formula for calculation by the converter model; and S43, the reactive power is obtained by inputting the obtained d-axis rotor current, d-axis stator voltage, the stator mutual inductance, the q-axis rotor current, the stator rotational velocity, the airflow input power, and the rotor electromagnetic torque to a predetermined reactive power calculation formula for calculation by the converter model.

It should be noted that, as those skilled in the art can clearly understand, for the convenience and brevity of the description, the specific implementation process of the above described method can refer to the corresponding processes in the above embodiment about the systems, devices, and units, which is not described in detail herein again.

Those skilled in the art should understand that the embodiments of the present application can be provided as a method, a system, or a computer program product. Therefore, the embodiments of the present application may be implemented with entire hardware, entire software or a combination of software and hardware. Moreover, the embodiments of the present application may be a computer program product implemented in a computer storage medium (including but not limited to disk storage, compact disc read-only memory (CD-ROM), optical storage, and others) including one or more computer program codes.

Figure 3:
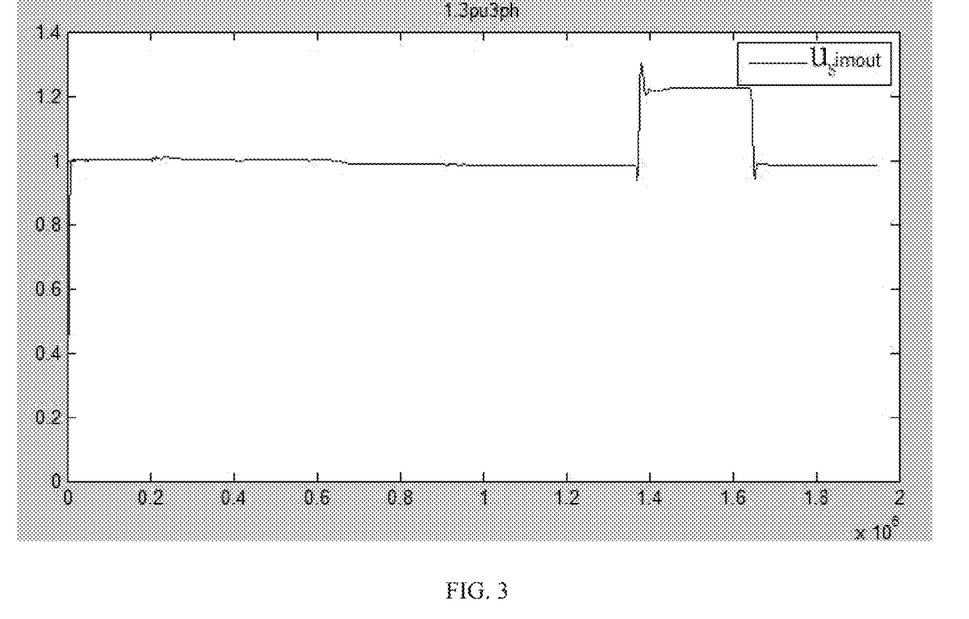
FIG. 3 shows a simulation result curve of a per unit value of a stator voltage of a converter when an evaluation of a three-phase symmetrical voltage fault is performed by a simulation evaluation method of the present disclosure.

The simulation evaluation method of the high voltage ride through capability in this embodiment was performed by a wind turbine system with a rated power of 2000 kW and an impeller diameter of 96 m. The results are shown as follows:

1. In the simulation evaluation of the three-phase symmetrical voltage fault, the stator voltage of the converter in the wind turbine system was increased to 1.3 PU of the rated voltage, and the duration of the fault was 500 ms:

FIG. 3 shows a simulation result curve of a per unit value of the stator voltage of the converter during the high voltage ride through. Since the wind turbine system output an inductive reactive power, the high voltage occurred at the high voltage side of the grid connection point of the wind power plant, and an action of the line impedance voltage division, the stator voltage of the converter actually merely rose to 1.22 PU of the rated voltage.

Figure 4:
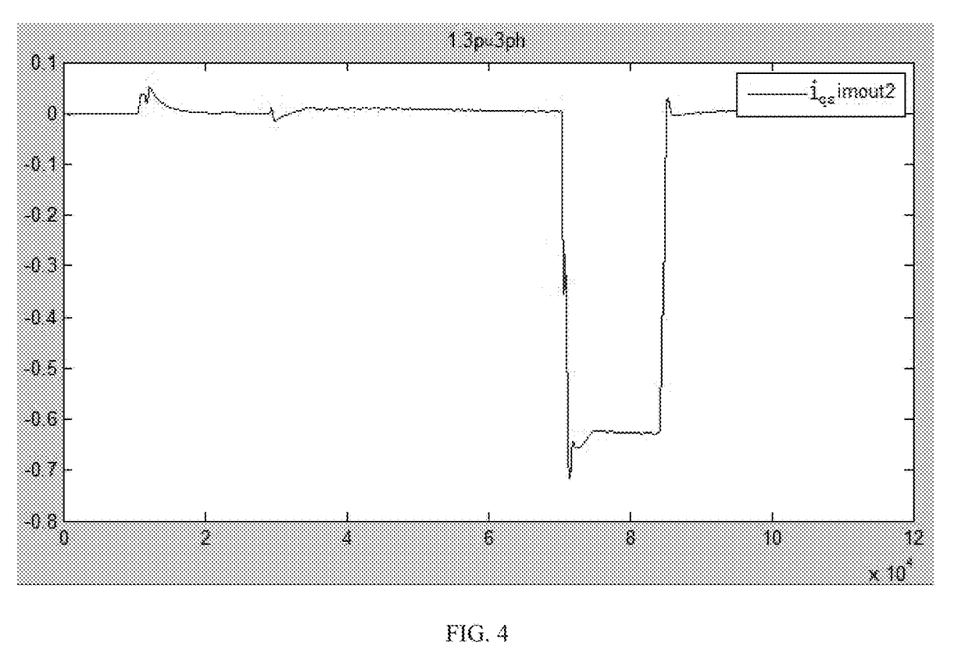
FIG. 4 shows a simulation result curve of a per unit value of a stator reactive current when an evaluation of a three-phase symmetrical voltage fault is performed by a simulation evaluation method of the present disclosure.

FIG. 4 shows a simulation result curve of a per unit value of the stator reactive current during the high voltage ride through. The wind turbine system output an inductive reactive current. After an adjustment for 30 ms, the stator reactive current was stable at 65% of the rated current.

Figure 5:
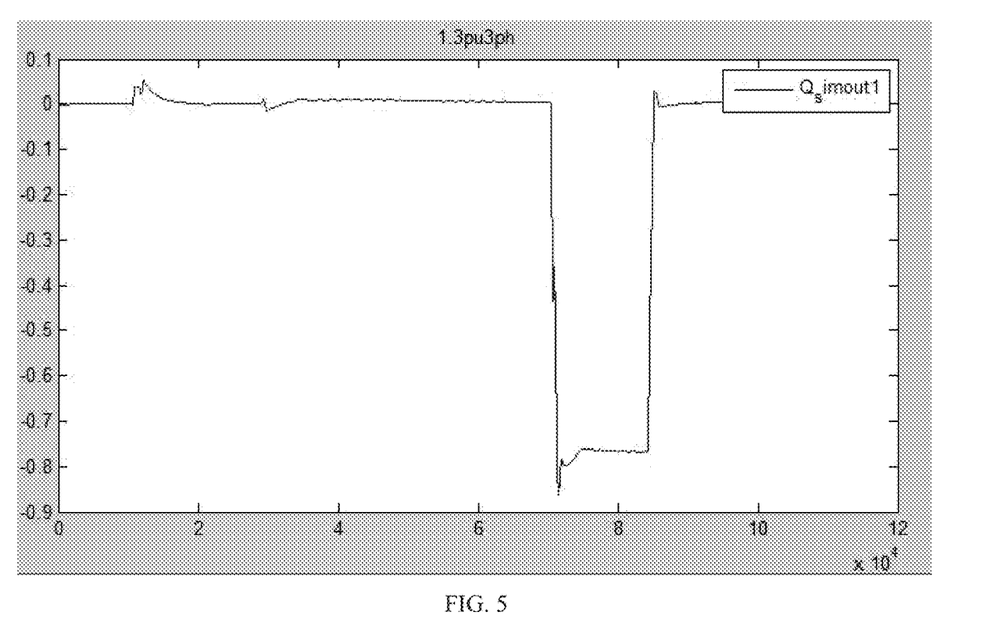
FIG. 5 shows a simulation result curve of a per unit value of a reactive power when an evaluation of a three-phase symmetrical voltage fault is performed by a simulation evaluation method of the present disclosure.

FIG. 5 shows a simulation result curve of a per unit value of the reactive power during the high voltage ride through. The wind turbine system output the inductive reactive power. After an adjustment for 30 ms, the reactive power was stable at 75% of the rated current.

Figure 6:
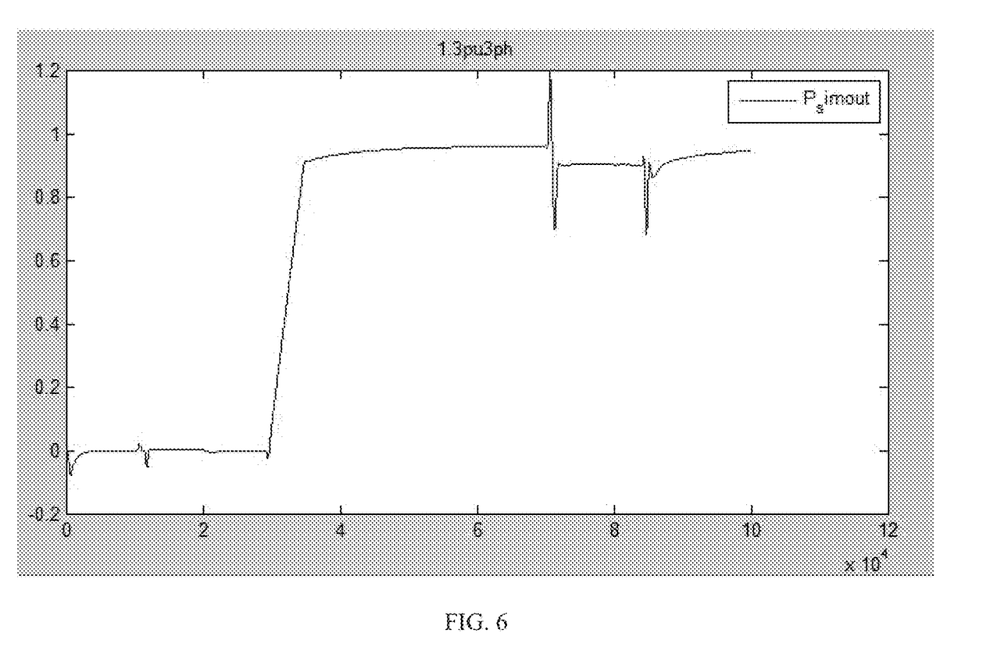
FIG. 6 shows a simulation result curve of a per unit value of an active power when an evaluation of a three-phase symmetrical voltage fault is performed by a simulation evaluation method of the present disclosure.

FIG. 6 shows a simulation result curve of a per unit value of the active power during the high voltage ride through. The active power of the wind turbine system rapidly increased to 1.2 times of the rated power when the voltage suddenly changes, and then gradually decreased. When the grid voltage returns to normal, the active power dropped to 90% of the rated power, and was then adjusted to the rated power after 3 cycles.

Figure 7:
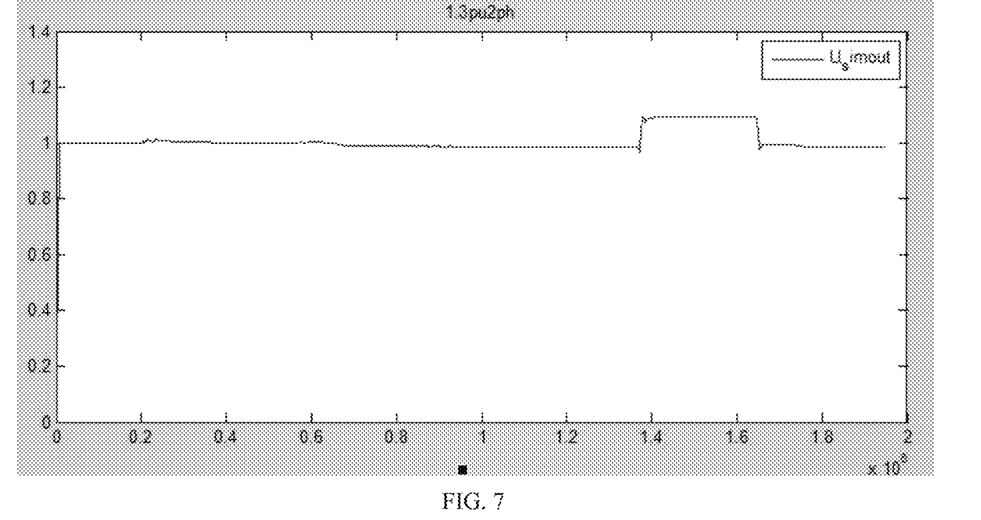
FIG. 7 shows a simulation result curve of a per unit value of a stator voltage of a converter when an evaluation of a two-phase asymmetric voltage fault is performed by a simulation evaluation method of the present disclosure.

2. In the simulation evaluation of the two-phase asymmetric voltage fault, the stator voltage of the converter in the wind turbine system was increased to 1.3 PU of the rated voltage, and the duration of the fault was 500 ms:

FIG. 7 shows a simulation result curve of a per unit value of the stator voltage of the converter during the high voltage ride through. Since the wind turbine system output the inductive reactive power, and action of the line impedance voltage division, the stator voltage of the converter actually merely rose to 1.1 PU of the rated voltage.

Figure 8:
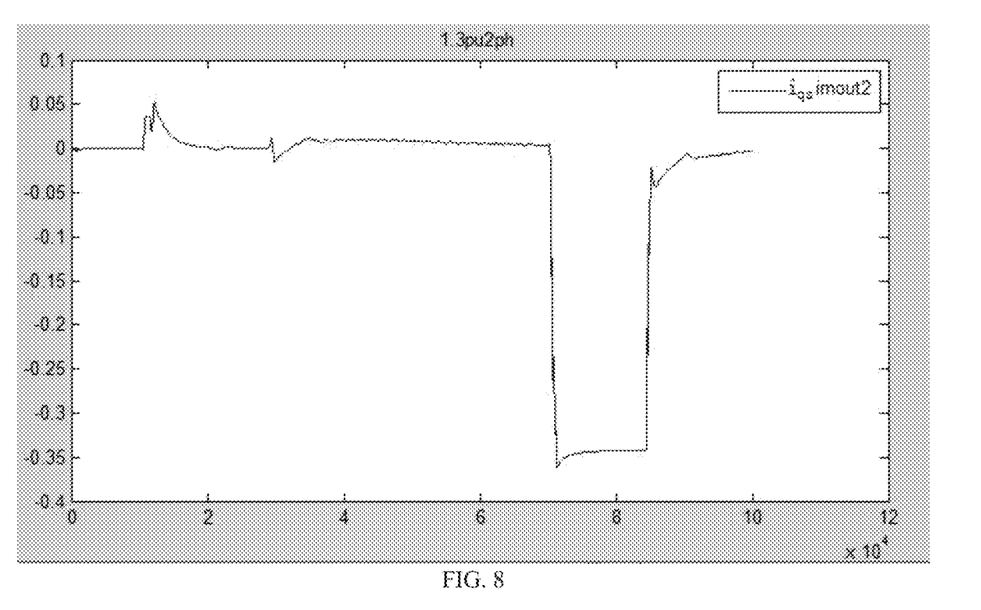
FIG. 8 shows a simulation result curve of a per unit value of a stator reactive current when an evaluation of a two-phase asymmetric voltage fault is performed by a simulation evaluation method of the present disclosure.

FIG. 8 shows a simulation result curve of a per unit value of the stator reactive current during the high voltage ride through. The wind turbine system output the inductive reactive current. After an adjustment for 30 ms, the stator reactive current was stable at 35% of the rated current.

Figure 9:
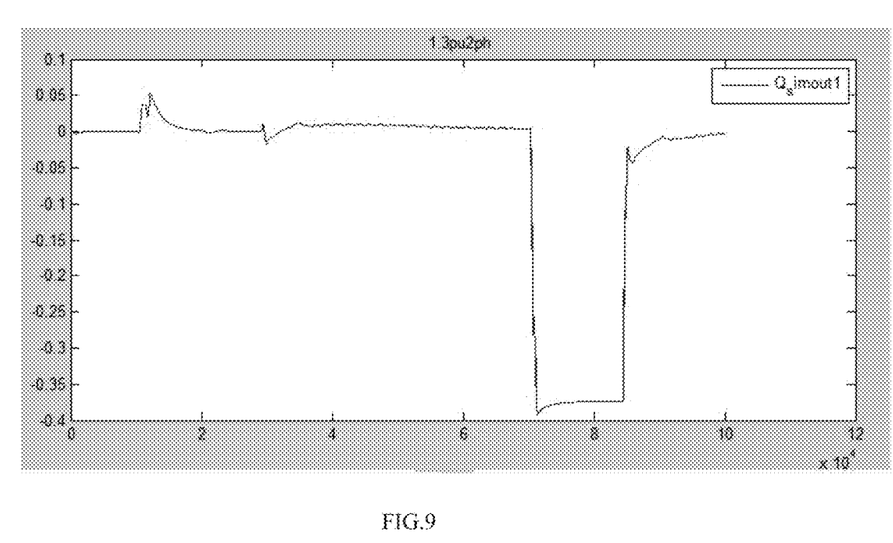
FIG. 9 shows a simulation result curve of a per unit value of a reactive power when an evaluation of a two-phase asymmetric voltage fault is performed by a simulation evaluation method of the present disclosure.

FIG. 9 shows a simulation result curve of a per unit value of the reactive power during the high voltage ride through. The wind turbine system output the inductive reactive power. After an adjustment for 30 ms, the reactive power was stable at 35% of the rated power.

Figure 10:
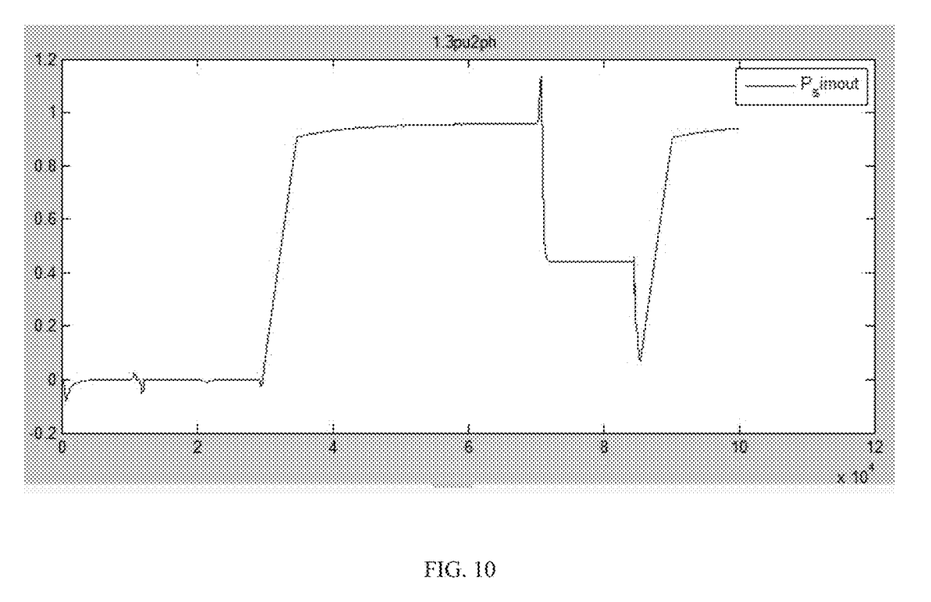
FIG. 10 shows a simulation result curve of a per unit value of an active power when an evaluation of a two-phase asymmetric voltage fault is performed by a simulation evaluation method of the present disclosure.

FIG. 10 shows a simulation result curve of a per unit value of the active power during the high voltage ride through. The active power of the wind turbine system rapidly increased to 1.2 times of the rated power when the voltage suddenly changes, and then is stable at 0.4 time of the rated power. When the grid voltage returns to normal, the active power dropped to 10% of the rated power, and was then adjusted to the rated power after 3 cycles.

The simulation evaluation model of the high voltage ride through capability, and the simulation evaluation method based thereon of the present disclosure can simulate a high voltage fault generated in high-level debugging process for direct current of power grid in practice, or cascading high voltage faults generated due to a plurality of reactive power generating devices in a wind power plant when failing to timely exit after the low voltage ride through, which is caused by cascading low voltage faults, and can evaluate the operating state in the fault process of the wind turbine system, determine whether the wind turbine system has the high voltage ride through capability by the simulation method, and can replace the high voltage ride through mobile vehicle test equipment on the spot, which reduces the test cost.

The above descriptions are only preferred embodiments of the present disclosure, and are not intended to limit the present disclosure in any way. Simple modifications, equivalent changes or modifications by using the technical content disclosed above may be made by those skilled in the art, which all fall within the scope of the present disclosure.

INDUSTRIAL APPLICABILITY

The simulation evaluation model of the high voltage ride through capability, and the simulation evaluation method based thereon of the present disclosure can simulate a high voltage fault generated in high-level debugging process for direct current of power grid in practice, or cascading high voltage faults generated due to a plurality of reactive power generating devices in a wind power plant when failing to timely exit after the low voltage ride through, which is caused by cascading low voltage faults, and can evaluate the operating state in the fault process of the wind turbine system, determine whether the wind turbine system has the high voltage ride through capability by the simulation method, and can replace the high voltage ride through mobile vehicle test equipment on the spot, which reduces the test cost.

What is claimed is:

1. A computer-implemented simulation evaluation model of a high voltage ride through capability, comprising:
    a wind turbine system aerodynamic model,
    a torque control model,
    a converter model, and
    a high voltage fault generating device model connected in sequence; wherein the wind turbine system aerodynamic model is configured to calculate an airflow input power according to an obtained first input initialization evaluation parameter;
    the torque control model is configured to calculate a rotor electromagnetic torque according to the airflow input power;
    the high voltage fault generating device model is configured to simulate a high voltage fault according to an obtained second input initialization evaluation parameter, and output a predetermined voltage on a low voltage side of a transformer; and
the converter model is configured to calculate a stator reactive current, an active power and a reactive power of a wind turbine system during the simulated high voltage fault according to the calculated airflow input power, the calculated rotor electromagnetic torque and the outputted predetermined voltage on the low voltage side of the transformer, the converter model is further configured to obtain the stator reactive current by inputting a −q-axis stator flux linkage, a predetermined stator self-inductance, a predetermined stator mutual inductance, and a predetermined q-axis rotor current to a predetermined stator reactive current calculation formula for calculation; the converter model is further configured to obtain the active power by inputting a stator rotational velocity, the airflow input power, the rotor electromagnetic torque, and the predetermined voltage on the low voltage side of the transformer into a predetermined active power calculation formula for calculation; and the converter model is further configured to obtain the reactive power by inputting a d-axis rotor current, a d-axis stator voltage, a stator mutual inductance, a q-axis rotor current, the stator rotational velocity, the airflow input power, and the rotor electromagnetic torque to a predetermined reactive power calculation formula for calculation; and wherein the simulation evaluation model determines whether a wind turbine system has high voltage ride through capability and generates an output that indicates whether the wind turbine system has high voltage ride through capability.

2. The computer-implemented simulation evaluation model of the high voltage ride through capability of claim 1, wherein, the wind turbine system aerodynamic model is further configured to obtain a wind turbine system blade length, a wind velocity, an air density, a wind turbine system blade angular velocity, and a wind energy availability; wherein, the obtained first input initialization evaluation parameter comprises: the wind turbine system blade length, the wind velocity, the air density, the wind turbine system blade angular velocity, and the wind energy availability; a tip speed ratio is obtained according to a ratio of a blade tip linear velocity to the wind velocity; and the airflow input power is obtained by inputting the wind turbine system blade length, the wind velocity, the air density, the wind energy availability, a blade pitch angle, and the tip speed ratio to a predetermined airflow input power calculation formula for calculation.

3. The computer implemented simulation evaluation model of the high voltage ride through capability of claim 2, wherein
    the torque control model is further configured to input a rotor mechanical inertia, a rotor motion damping coefficient, and a rotor mechanical angular velocity into a rotor electromagnetic torque calculation formula preset in the torque control model for calculation.

4. The computer implemented simulation evaluation model of the high voltage ride through capability of claim 2, wherein
    the high voltage fault generating device model is further configured to obtain a series reactor impedance value, a grid impedance, and a wind turbine system capacity, wherein, the obtained second input initialization evaluation parameter comprises: the series reactor impedance value, the grid impedance, and the wind turbine system capacity; and the predetermined voltage on the low voltage side of the transformer is obtained by inputting the series reactor impedance value, the grid impedance and the wind turbine system capacity to a predetermined calculation formula of a predetermined voltage on the low voltage side of the transformer configured to simulate the high voltage fault.

5. The computer-implemented simulation evaluation model of the high voltage ride through capability of claim 1, wherein, the airflow input power $P_m$ is calculated according to the following formula:

$$P_m = \frac{1}{2}\pi r_b^2 v_w^3 \rho c_p(\lambda, \beta),$$

wherein $P_m$ is the airflow input power, r is the ratio of circumference to diameter, $r_b$ is the wind turbine system blade length, $v_w$ is the wind velocity, $\rho$ is the air density, $\lambda$ is the tip speed ratio, that is, the ratio of the blade tip linear velocity to the wind velocity, $$\lambda = \frac{w_b r_b}{v_w},$$

$w_b$ is the wind turbine system blade angular velocity, $\beta$ is the blade pitch angle, and $c_p$ is the wind energy availability.

6. The computer implemented simulation evaluation model of the high voltage ride through capability of claim 5, wherein
    the torque control model is further configured to input a rotor mechanical inertia, a rotor motion damping coefficient, and a rotor mechanical angular velocity into a rotor electromagnetic torque calculation formula preset in the torque control model for calculation.

7. The computer implemented simulation evaluation model of the high voltage ride through capability of claim 5, wherein the high voltage fault generating device model is further configured to obtain a series reactor impedance value, a grid impedance, and a wind turbine system capacity, wherein, the obtained second input initialization evaluation parameter comprises: the series reactor impedance value, the grid impedance, and the wind turbine system capacity; and the predetermined voltage on the low voltage side of the transformer is obtained by inputting the series reactor impedance value, the grid impedance and the wind turbine system capacity to a predetermined calculation formula of a predetermined voltage on the low voltage side of the transformer configured to simulate the high voltage fault.

8. The computer implemented simulation evaluation model of the high voltage ride through capability of claim 5, wherein
the high voltage fault generating device model is further configured to obtain a series reactor impedance value, a grid impedance, and a wind turbine system capacity, wherein, the obtained second input initialization evaluation parameter comprises: the series reactor impedance value, the grid impedance, and the wind turbine system capacity; and the predetermined voltage on the low voltage side of the transformer is obtained by inputting the series reactor impedance value, the grid impedance and the wind turbine system capacity to a predetermined calculation formula of a predetermined voltage on the low voltage side of the transformer configured to simulate the high voltage fault.

9. The computer-implemented simulation evaluation model of the high voltage ride through capability of claim 1, wherein
the torque control model is further configured to input a rotor mechanical inertia, a rotor motion damping coefficient, and a rotor mechanical angular velocity into a rotor electromagnetic torque calculation formula preset in the torque control model for calculation.

10. The computer-implemented simulation evaluation model of the high voltage ride through capability of claim 9, wherein, the rotor electromagnetic torque $T_e$ is calculated according to the following formula:

$$T_e = \frac{P_m}{w_{rm}} - \left(J_r \frac{dw_{rm}}{dt} + k_r w_{rm}\right),$$

wherein, $T_e$ is the rotor electromagnetic torque, $P_m$ is the airflow input power, $J_r$ is the rotor mechanical inertia, $k_r$ is the rotor motion damping coefficient, and $w_{rm}$ is the rotor mechanical angular velocity.

11. The computer-implemented simulation evaluation model of the high voltage ride through capability of claim 1, wherein
the high voltage fault generating device model is further configured to obtain a series reactor impedance value, a grid impedance, and a wind turbine system capacity, wherein, the obtained second input initialization evaluation parameter comprises: the series reactor impedance value, the grid impedance, and the wind turbine system capacity; and the predetermined voltage on the low voltage side of the transformer is obtained by inputting the series reactor impedance value, the grid impedance and the wind turbine system capacity to a predetermined calculation formula of a predetermined voltage on the low voltage side of the transformer configured to simulate the high voltage fault.

12. The computer-implemented simulation evaluation model of the high voltage ride through capability of claim 11, wherein, the predetermined voltage $u_s$ on the low voltage side of the transformer is calculated as follows:

$$X_1 = \frac{u_s^2}{3 * S_{WT}} - X_{grid},$$

wherein, $u_s$ is the predetermined voltage on the low voltage side of the transformer, i.e., a stator voltage of a converter, $X_1$ is the series reactor impedance value, $X_{grid}$ is the grid impedance, and $S_{WT}$ is the wind turbine system capacity.

13. The computer-implemented simulation evaluation model of the high voltage ride through capability of claim 1, wherein, a calculation formula of the stator reactive current $i_{qs}$ is as follows:

$$i_{qs} = \frac{\lambda_{qs} - L_M i_{qr}}{L_S},$$

wherein, $i_{qs}$ is a q-axis stator current, i.e. the stator reactive current, $\lambda_{qs}$ is the q-axis stator flux linkage, $L_S$ is the predetermined stator self inductance, $L_M$ is the stator mutual inductance, and $i_{qr}$ is the q-axis rotor current;
calculation formulas of the active power $P_S$ and the reactive power $Q_S$ are respectively as follows:

$$\begin{cases} P_S = \frac{T_e \omega_s}{P_m} \\ Q_S = -\frac{T_e}{P_m i_{dr}}\left(\omega_s i_{qr} + \frac{v_{ds}}{L_M}\right) \end{cases},$$

wherein $P_S$ is the active power, $Q_S$ is the reactive power, $P_m$ is the airflow input power, $T_e$ is the rotor electromagnetic torque, and $w_s$ is the stator rotational velocity, $i_{dr}$ and $i_{qr}$ are the d-axis rotor current and the q-axis rotor current, respectively, vas is the d-axis stator voltage, and $L_M$ is the stator mutual inductance.

14. A simulation evaluation method of the high voltage ride through capability based on the computer implemented simulation evaluation model of the high voltage ride through capability of claim 1, comprising the following steps:
calculating the airflow input power by the wind turbine system aerodynamic model according to the obtained first input initialization evaluation parameter;
calculating the rotor electromagnetic torque by the torque control model according to the airflow input power obtained;
simulating the high voltage fault and outputting the predetermined voltage on the low voltage side of the transformer by the high voltage fault generating device model according to the obtained second input initialization evaluation parameter;
calculating the stator reactive current, the active power and the reactive power of the wind turbine system during the high voltage fault by the converter model according to the airflow input power, the rotor electromagnetic torque, and the predetermined voltage on the low voltage side of the transformer; and determining whether the wind turbine system has the high voltage ride through capability according to the predetermined voltage on the low voltage side of the transformer, the stator reactive current, the active power, and the reactive power, and generating an output that indicates whether the wind turbine system has high voltage ride through capability.

15. The simulation evaluation method of the high voltage ride through capability based on the simulation evaluation model of the high voltage ride through capability of claim 14, wherein, the step of calculating the airflow input power by the wind turbine system aerodynamic model according to the obtained first input initialization evaluation parameter, comprises:

obtaining a wind turbine system blade length, a wind velocity, a air density, a wind turbine system blade angular velocity, and a wind energy availability by the wind turbine system aerodynamic model, wherein, the initialization evaluation parameter comprises: the wind turbine system blade length, the wind velocity, the air density, the wind turbine system blade angular velocity, and the wind energy availability;

obtaining a tip speed ratio according to a ratio of a blade tip linear velocity to the wind velocity; and obtaining the airflow input power by inputting the wind turbine system blade length, the wind velocity, the air density, the wind energy availability, a blade pitch angle, and the tip speed ratio to a predetermined airflow input power calculation formula for calculation by the wind turbine system aerodynamic model.

16. The simulation evaluation method of the high voltage ride through capability based on the computer implemented simulation evaluation model of the high voltage ride through capability of claim 14, wherein, the step of calculating the rotor electromagnetic torque by the torque control model according to the airflow input power obtained, comprises: inputting the torque control model inputting a rotor mechanical inertia, a rotor motion damping coefficient, and a rotor mechanical angular velocity to a rotor electromagnetic torque calculation formula preset in the torque control model for calculation.

17. The simulation evaluation method of the high voltage ride through capability based on the computer implemented simulation evaluation model of the high voltage ride through capability of claim 14, wherein, the step of simulating the high voltage fault and outputting the predetermined voltage on the low voltage side of the transformer by the high voltage fault generating device model according to the obtained second input initialization evaluation parameter, comprises:

obtaining a series reactor impedance value, a grid impedance, and a wind turbine system capacity by the high voltage fault generating device model, wherein, the initialization evaluation parameter comprises: the series reactor impedance value, the grid impedance, and the wind turbine system capacity; and obtaining the predetermined voltage on the low voltage side of the transformer by inputting the series reactor impedance value, the grid impedance and the wind turbine system capacity to a predetermined calculation formula of a predetermined voltage on the low voltage side of the transformer configured to simulate the high voltage fault.

18. The simulation evaluation method of the high voltage ride through capability based on the computer implemented simulation evaluation model of the high voltage ride through capability of claim 14, wherein, the step of calculating the stator reactive current, the active power and the reactive power of the wind turbine system during the high voltage fault by the converter model according to the airflow input power, the rotor electromagnetic torque, and the predetermined voltage on the low voltage side of the transformer, comprises:

obtaining the stator reactive current by inputting a q-axis stator flux linkage, a predetermined stator self inductance, a predetermined stator mutual inductance, and a predetermined q-axis rotor current to a predetermined stator reactive current calculation formula for calculation in the converter model;

obtaining the active power by inputting a stator rotational velocity, the airflow input power, the rotor electromagnetic torque, and the predetermined voltage on the low voltage side of the transformer into a predetermined active power calculation formula for calculation by the converter model; and obtaining the reactive power by inputting a d-axis rotor current, a d-axis stator voltage, a stator mutual inductance, the q-axis rotor current, the stator rotational velocity, the airflow input power, and the rotor electromagnetic torque to a predetermined reactive power calculation formula for calculation by the converter model.

19. A readable storage medium, comprising executable instructions stored in the readable storage medium, wherein, when the instructions are executed by one or more processors, the simulation evaluation method of the high voltage ride through capability based on the computer implemented simulation evaluation model of the high voltage ride through capability of claim 14 is realized.

* * * * *